United States Patent
Jafri et al.

(10) Patent No.: US 7,353,354 B2
(45) Date of Patent: *Apr. 1, 2008

(54) APPLICATION-BASED COMMIT FOR LOCAL STORAGE SUBSYSTEMS AND REMOTE STORAGE SUBSYSTEMS

(75) Inventors: Amir A. Jafri, San Jose, CA (US); Mark J. Seaman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/733,649

(22) Filed: Apr. 10, 2007

(65) Prior Publication Data

US 2007/0198793 A1    Aug. 23, 2007

Related U.S. Application Data

(63) Continuation of application No. 10/897,284, filed on Jul. 22, 2004, now Pat. No. 7,243,201.

(51) Int. Cl.
G06F 12/14 (2006.01)

(52) U.S. Cl. ...................................... 711/163
(58) Field of Classification Search ................ 711/112, 711/113, 163
See application file for complete search history.

(56) References Cited

U.S. PATENT DOCUMENTS

| | | | | |
|---|---|---|---|---|
| 5,321,832 A | * | 6/1994 | Tanaka et al. ............... | 707/204 |
| 5,557,770 A | * | 9/1996 | Bhide et al. ................. | 711/161 |
| 5,640,561 A | * | 6/1997 | Satoh et al. ................. | 707/202 |
| 5,659,704 A | * | 8/1997 | Burkes et al. .............. | 711/114 |
| 5,794,254 A | * | 8/1998 | McClain ...................... | 707/204 |
| 6,023,710 A | * | 2/2000 | Steiner et al. .............. | 707/204 |
| 6,253,271 B1 | * | 6/2001 | Ram et al. ................... | 710/306 |
| 6,396,805 B2 | * | 5/2002 | Romrell ....................... | 370/216 |
| 6,460,123 B1 | * | 10/2002 | Blumenau .................... | 711/162 |
| 6,490,596 B1 | * | 12/2002 | Micka ......................... | 707/203 |
| 2002/0073082 A1 | * | 6/2002 | Duvillier et al. ............... | 707/3 |
| 2003/0135704 A1 | * | 7/2003 | Martin ........................ | 711/162 |

* cited by examiner

*Primary Examiner*—Kevin L. Ellis
(74) *Attorney, Agent, or Firm*—Cardinal Law Group

(57) ABSTRACT

A system to protect data including a processor and a memory coupled to the processor to store instructions executable by a digital processing apparatus. The memory is operable to perform operations to protect stored data. The operations include receiving a write request for a current data input comprising input to be written to at least one monitored region of a storage volume, determining whether the current data input is a complete managed object and whether the current data input completes a previously deferred I/O operation and writing the current data input to a deferred storage device based on the determinations. Therefore, the system writes complete managed objects to the physical disk storage medium.

16 Claims, 10 Drawing Sheets

100

APPLICATION-BASED COMMIT FOR LOCAL STORAGE SUBSYSTEMS AND REMOTE STORAGE SUBSYSTEMS

RELATED APPLICATIONS

This application claims the benefit of U.S. patent application Ser. No. 10/897,284 filed Jul. 22, 2004 now U.S. Pat. No. 7,243,201 as a continuation application. The entirety of that application is incorporated herein by reference.

FIELD OF INVENTION

The present invention generally relates to protecting data. More particularly, the present invention relates to a system of protecting data against loss resulting from successful, but incomplete write operations to storage devices.

BACKGROUND OF THE INVENTION

File systems, applications, and database systems frequently use some multiple of storage device block size when writing data to storage devices. A "block" is the smallest unit read and written by a storage device. Typically, disk storage devices use a block size of 512 bytes. The groups of blocks used by applications are called "pages" or "extents" and are the smallest unit of data written to storage devices. When there is a failure resulting in a break in the data flow to storage devices, an incomplete "page" is sometimes written to the storage device. Failures include the abnormal termination of the operating system ("crash") for local storage devices or power failures in the computer system or the storage network device.

Copying data between local and remote storage subsystems is a widely used method to protect data stores against storage subsystem failures and catastrophic events. Many clustering applications rely on remote mirroring technology to prevent the loss of data during a failure at a production site. Additionally, many clustering applications rely on local backup to prevent data loss during a failure at portions of a production site. It is crucial to customers that these storage technologies are reliable and do not introduce errors or inconsistencies in the data.

Mirroring and local backup is generally implemented at the storage subsystem block level while databases and other applications write data at the page level. The extent size for file systems and the page size for applications to be backed-up is usually some multiple of the storage device block size. Problems can occur when page sizes are greater than the underlying storage device block size. Due to this mismatch, there is a chance for a failure to occur when only a partial page has been written to the storage device.

For example, a page that includes several disk blocks is transmitted to the storage system in one or more write requests that may be separated in time. If the transmission media, such as a fiber channel, is broken after the first disk block is transmitted but before the last disk block is transmitted, the page will be inconsistent at the storage system. The first part of the stored page contains the new data while the rest of stored the page still contains the original data. If the break in the transmission media is the result of a power failure, operating system "crash," or disaster, it can render the database useless or "unrecoverable".

Some relational database systems terminate with an error if mismatched page sections are detected. In some database systems and applications, the mismatched page section goes undetected. In that case, the database or application has hidden data inconsistencies.

The only way to obtain the lost data is to retrieve a backup copy of the database or file system from some alternate media, such as magnetic tape. Many customers employ storage subsystem point-in-time copy or remote mirroring to achieve low Recovery Time Objectives (RTO) to get the system backup quickly. Customers also employ storage subsystem remote mirroring to achieve high Recovery Point Objectives (RPO) to minimize data loss as a result of failure. If tape or other backup media are required to recover lost data, the benefits of RTO and RPO are lost.

It is desirable to have a data backup technology that overcomes problems due to mismatching of data page and storage device block sizes in storage subsystems. It is further desirable to have a technology that ensures that the data recorded on a storage device media is consistent. It is further desirable to have a technology that can guarantee a database system is recoverable on a local or remote storage subsystem.

SUMMARY OF THE INVENTION

In view of the above limitations of existing data storage systems and remote-mirroring systems it is the object of the present invention to provide a reliable data storage technology in the event of a system or subsystem failure during the transfer of data to local or remote storage subsystems.

One form of the present invention is a system to protect data. The system includes a processor and a memory coupled to the processor to store instructions executable by a digital processing apparatus. The memory is operable to perform operations to protect stored data. The operations include receiving a write request for a current data input including input to be written to at least one monitored region of a storage volume, determining whether the current data input is a complete managed object and whether the current data input completes a previously deferred I/O operation and writing the current data input to a deferred storage device based on the determinations.

A second form of the present invention is a computer readable medium storing a computer program executable by a digital processing apparatus to perform operations to protect data. The operations include receiving a write request for a current data input including input to be written to at least one monitored region of a storage volume, determining whether the current data input is a complete managed object and whether the current data input completes a previously deferred I/O operation. The operations additionally include writing the current data input to a deferred storage device based on the determinations.

A third form of the present invention is a system to protect data. The system includes a deferred storage device and a processor, which receives a write request for a current data input including input to be written to at least one monitored region of a storage volume. The processor determines whether the current data input is a complete managed object and whether the current data input completes a previously deferred I/O operation. The deferred storage device stores the current data input based on the determinations of the processor.

The forgoing form and other forms, objects and aspects as well as features and advantages of the present invention will become further apparent from the following detailed description of the presently preferred embodiments, read in conjunction with the accompanying drawings. The detailed description and drawings are merely illustrative of the present invention rather than limiting the scope of the present invention being defined by the appended claims and equivalents thereof.

DETAILED DESCRIPTION OF THE PREFERRED EMBODIMENTS

The present invention will now be described more fully hereinafter with reference to the accompanying figures, in which preferred embodiments are shown. This invention may, however, be embodied in many different forms and should not be construed as limited to the embodiments set forth herein. Like numbers refer to like elements throughout.

In all embodiments of the present invention, a computer program is initialized with the page size of the application or database, storage device(s) or storage subsystems, volumes, and regions of volumes that require protection for the aforementioned partial-page-write failures. The combination of storage device, volume, and part of volume containing data requiring protection is a "monitored region." The present invention includes a set of instructions ("computer program"), memory, and processor. The various embodiments of the present invention differ in the location of the processor, memory, and computer program and the point at which partial-page-writes are detected. The monitored region of storage may be a local, direct attached storage volume, a local storage subsystem attached through a Storage Area Network (SAN) or a remotely replicated storage volume.

Figure 1A:
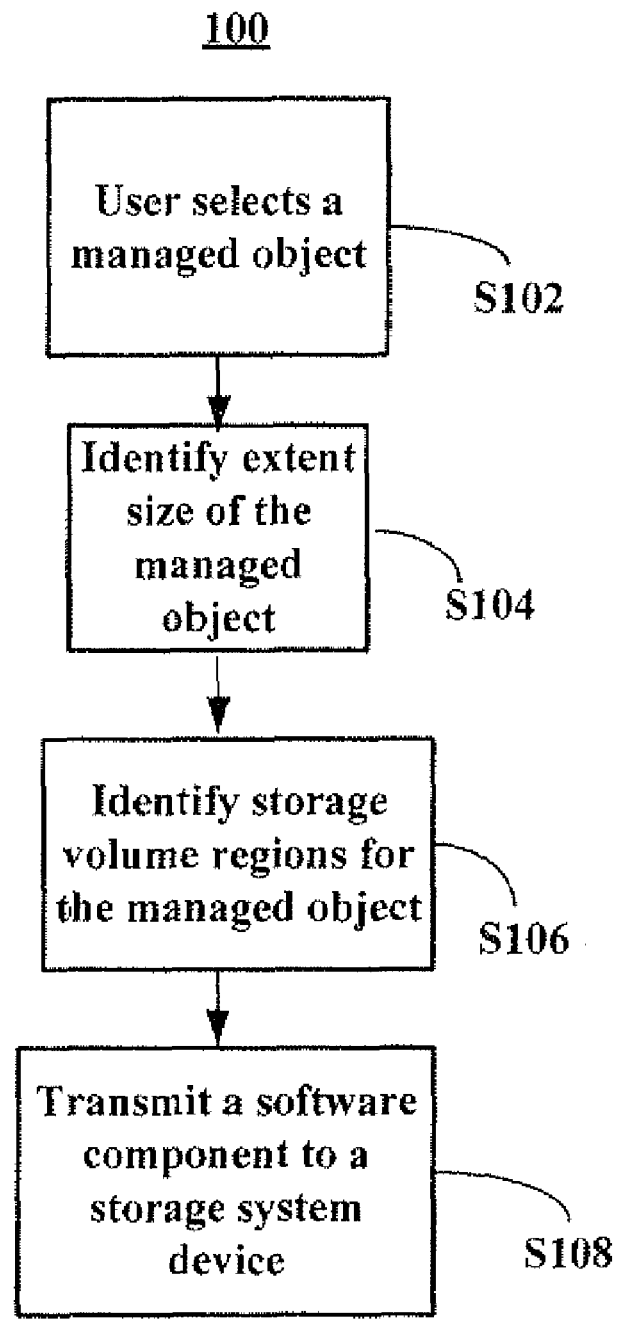
FIG. 1A illustrates a flowchart representative of an initialization process to protect a managed object during transfer of data to a storage device in accordance with a first embodiment of the present invention.

FIG. 1A illustrates a flowchart 100 representative of an initialization process to protect a managed object during transfer of data to a storage device in accordance with a first embodiment of the present invention. The initialization process for a storage session management is performed once per application or database.

At S102, the user selects a managed object, such as a database tablespace, a file system or other grouping of data and/or software objects to be monitored. The managed object is monitored during a subsequent transfer of data as the managed object is written to a local or remote storage device.

At S104, a software program in the computer of the user identifies the extent size of the managed object stored within the storage device. At S106, the software program identifies the storage volume regions used by the managed object. The storage volume is a logical disk device. It is called a storage volume rather than a disk drive because most storage subsystems implement protection through a redundant array of inexpensive (independent) disks (RAID), so the server sees a logical disk drive rather than a physical disk drive. The process of mapping logical components to physical storage volumes is known to those of ordinary skill in the art. Each storage volume can be used for a number of purposes. In some cases, only a subset of the blocks on the volume requires management.

At S108, the software program in the computer of the user transmits a software component based on the identified extent size and identified storage volume regions to a storage system device. The software component includes the extent size and location of identified storage volume regions of the managed object. The transmitted software component is received at the storage system device and embedded in the storage system device. During a subsequent data transfer of the managed object or portion of the managed object, the embedded software component is used to monitor the data transfer. The storage system device may be a host bus adapter, a remote storage subsystem controller or a local storage subsystem controller. In one embodiment, the embedded software component is embedded in a processor in the host bus adapter.

The host bus adapter is a circuit card that is plugged into a host computer. The host bus adapter is used to control storage devices. Host bus adapters often implement the Small Computer System Interface (SCSI) protocol. Modern host bus adapters include Fiber Channel (FC) controllers, which implement the SCSI protocol over fiber optic media.

Once initialization has been completed, a software program monitors the application or database storage usage and updates the initial configuration if the number or size of the configured storage volume changes.

Figure 1B:
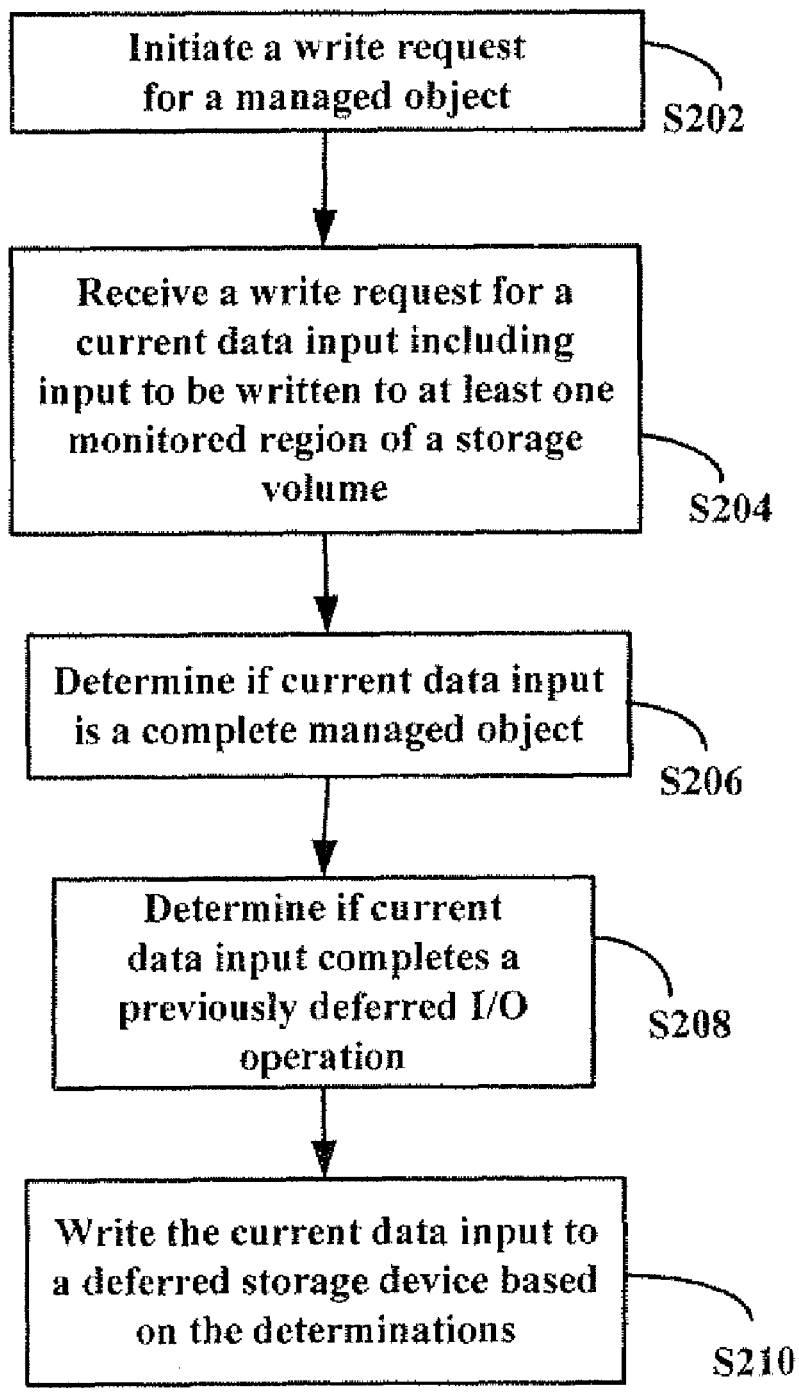
FIG. 1B illustrates a flowchart representative of a storage session management flow to protect a managed object during transfer of data to a storage device in accordance with the present invention.

FIG. 1B illustrates a flowchart 200 representative of a storage session management flow to protect a managed object during transfer of data to a storage device in accordance with the present invention. At S202, a user initiates a write request for a managed object or part of a managed object. During the initiation of the write request for a managed object, a computer program stored on a computer readable medium determines if the managed object spans more than one data block. If the managed object spans more than one data block, it is possible that only a portion of the managed object is contained in a single write request.

When a user initiates a write request to store an object in a storage device, the object is segmented into pages and data blocks. A page is the smallest unit in an I/O operation and is typically 8 Kbytes. A data block is typically 512 bytes. All write requests contain header information to identify the location in which the data is to be written. The managed object is identified by this header address.

The write request for a managed object includes a stream of data segments, which are referred to herein as current data inputs. The current data inputs included in the write request are sequentially received at a controller of a server and/or storage subsystem.

An I/O operation includes write requests and/or read requests. The present invention is only applicable to write requests. The phrases "I/O request" and "write request" are used interchangeably within this document.

At S204, a write request for a current data input is received at a server or storage subsystem. The current data input includes data input to be written to at least one monitored region of a storage volume.

At S206, the software component determines if the current data input is a complete managed object. To make this determination, the processor in the storage system device compares the information in the write request header with the data embedded in the storage system device that identifies the monitored region of the storage volume. The embedded data is in the software component that was transmitted to the storage system device during S108 as described in flowchart 100.

At S208, a processor in the storage system device determines if the current data input completes a previously deferred I/O operation. A memory is coupled to the processor to store instructions executable by a digital processing apparatus. The processor in the storage system device monitors the destination address of the received write request to determine if the current data input completes a previously deferred I/O operation. In one embodiment the destination address is a logical block address.

At S210, the processor in the storage system device writes the current data input to a deferred storage device in the storage system device based on the determinations at S206 and S208. The processor in the storage system device writes the current data input to a deferred storage device if the current data input is not a complete managed object and if the current data input does not complete a previously deferred I/O operation.

Figure 2:
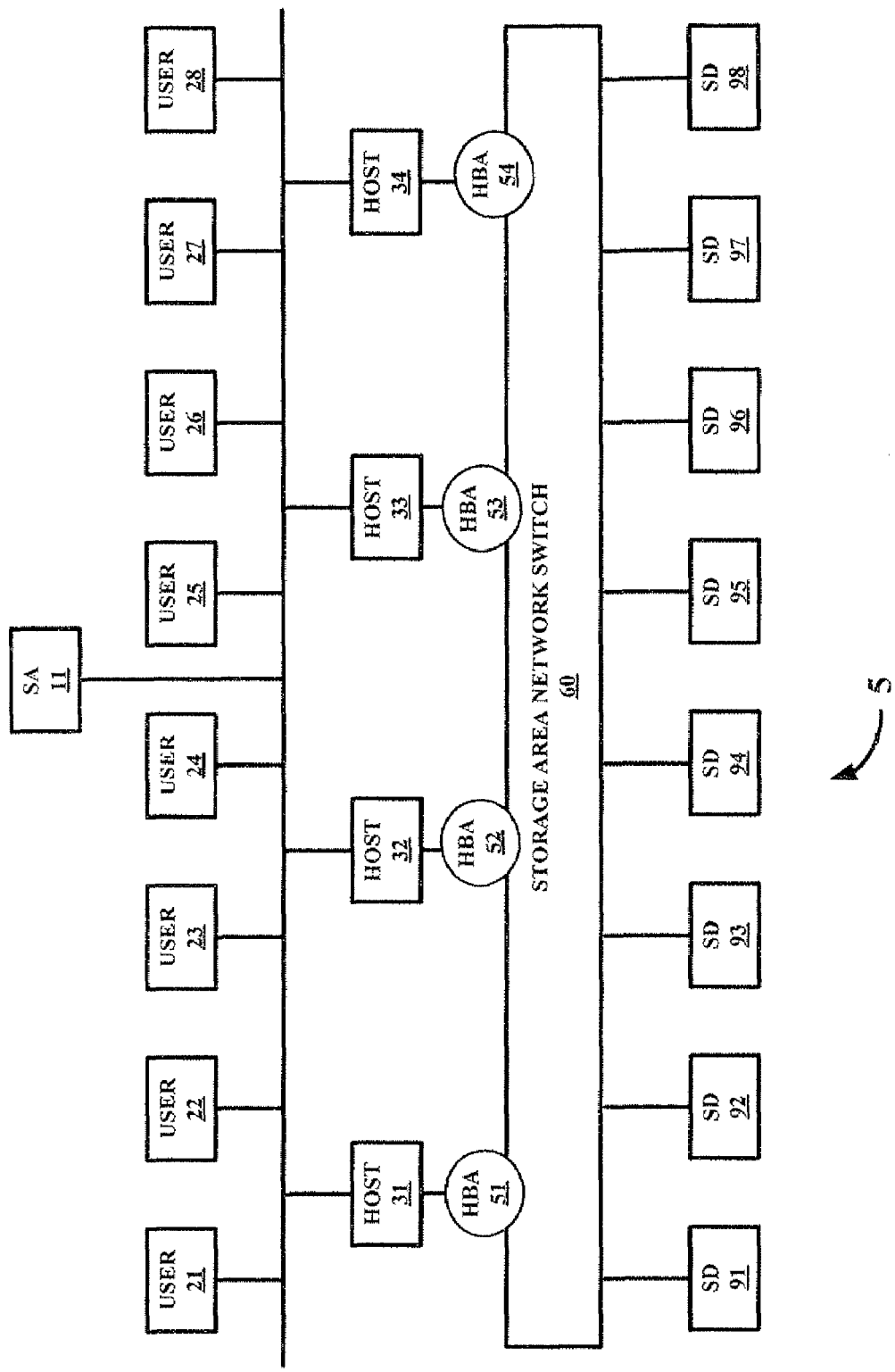
FIG. 2 illustrates a schematic of a local storage system configuration in accordance with a first embodiment of the present invention.

FIG. 2 illustrates a schematic of a storage system 5 configuration in accordance with a first embodiment of the present invention. System 5 includes users 21-28 operating conventional computing devices, such as mainframes, personal computers, personal digital assistants (PDAs), etc. The system administrator (SA) 11 manages the users 21-28. The users 21-28 are linked to a storage system, which includes host computers (HOST) 31-34 and local storage devices (SD) 91-98. Host bus adapters (HBA) 51-54 are pluggable circuit cards connected to the host computers 31-34, respectively. Host bus adapters 51-54 control local storage devices 91-98. Host bus adapters 51-54 include a deferred storage device (not shown) and a processor (not shown) to perform the logic required to make determinations about received data inputs. The host bus adapters 51-54 include a memory (not shown) coupled to the processor. The memory stores instructions in a computer program on computer readable medium, which are executable by a digital processing apparatus to perform the operations to protect stored data. The processor exists in all modern HBAs. In one embodiment taking advantage of the existing processor and storage components, computer instructions are added to the computer program (firmware) in the HBA that manages the storage subsystem.

The processor, memory, and computer instructions contained on a host bus adapter 51-54 are used by the computer system to communicate to the storage devices 91-98. Storage area network switch 60 in communication with host bus adapters 51-54 is operable to transmit data from the host computers 31-34 to one or more of the local storage devices 91-98. Storage area network switch 60 includes switches, such as optical switches or electronic switches in communication with permanent connections, such as wire or fiber optic cables.

Figure 3:
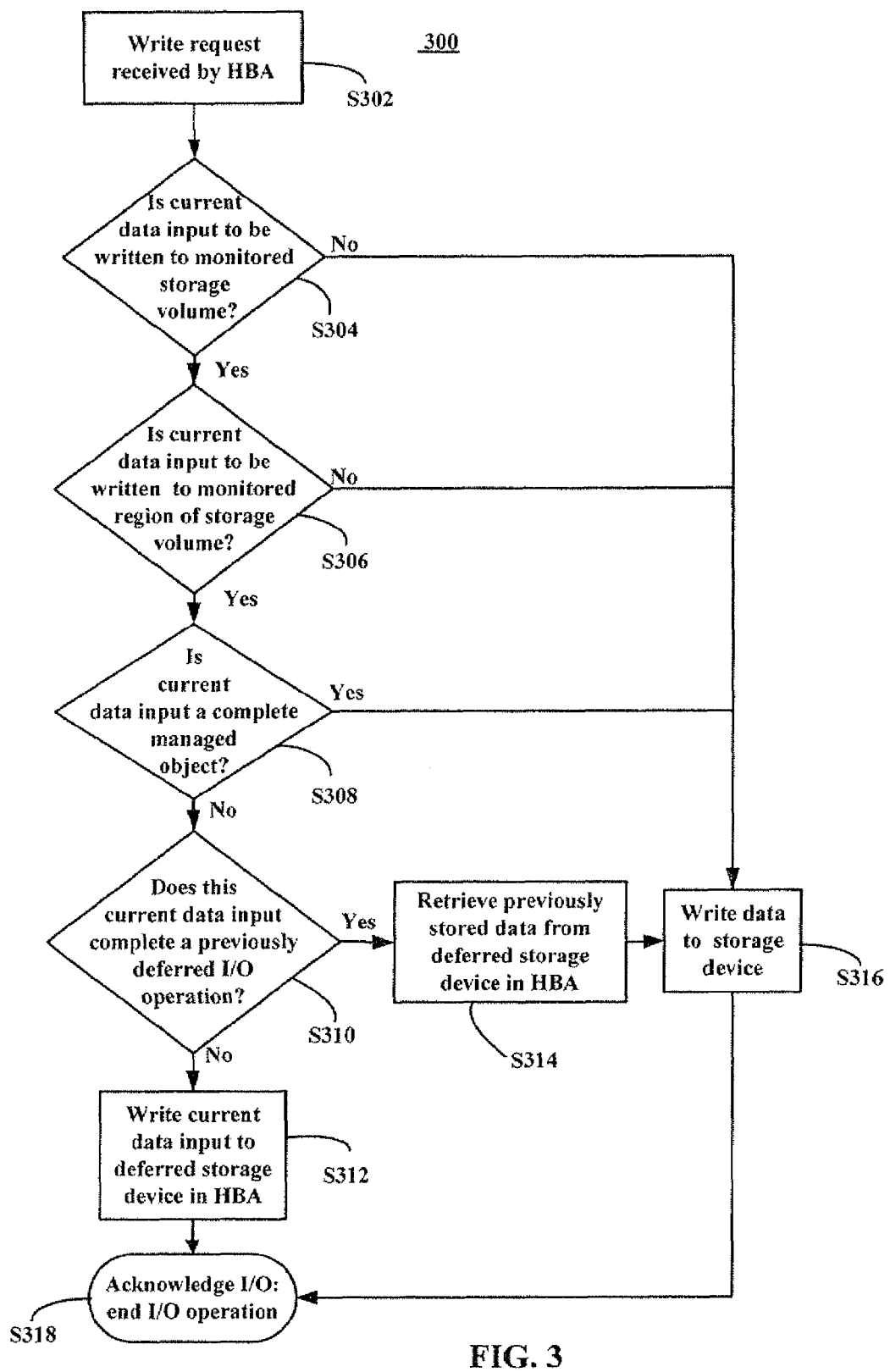
FIG. 3 illustrates a flowchart representative of a local host bus adapter storage session management flow relating to the system illustrated in FIG. 2.

FIG. 3 illustrates a flow chart 300 representative of a method of local host bus adapter storage session relating to the exemplary embodiment of system 5 illustrated in FIG. 2.

Figure 5:
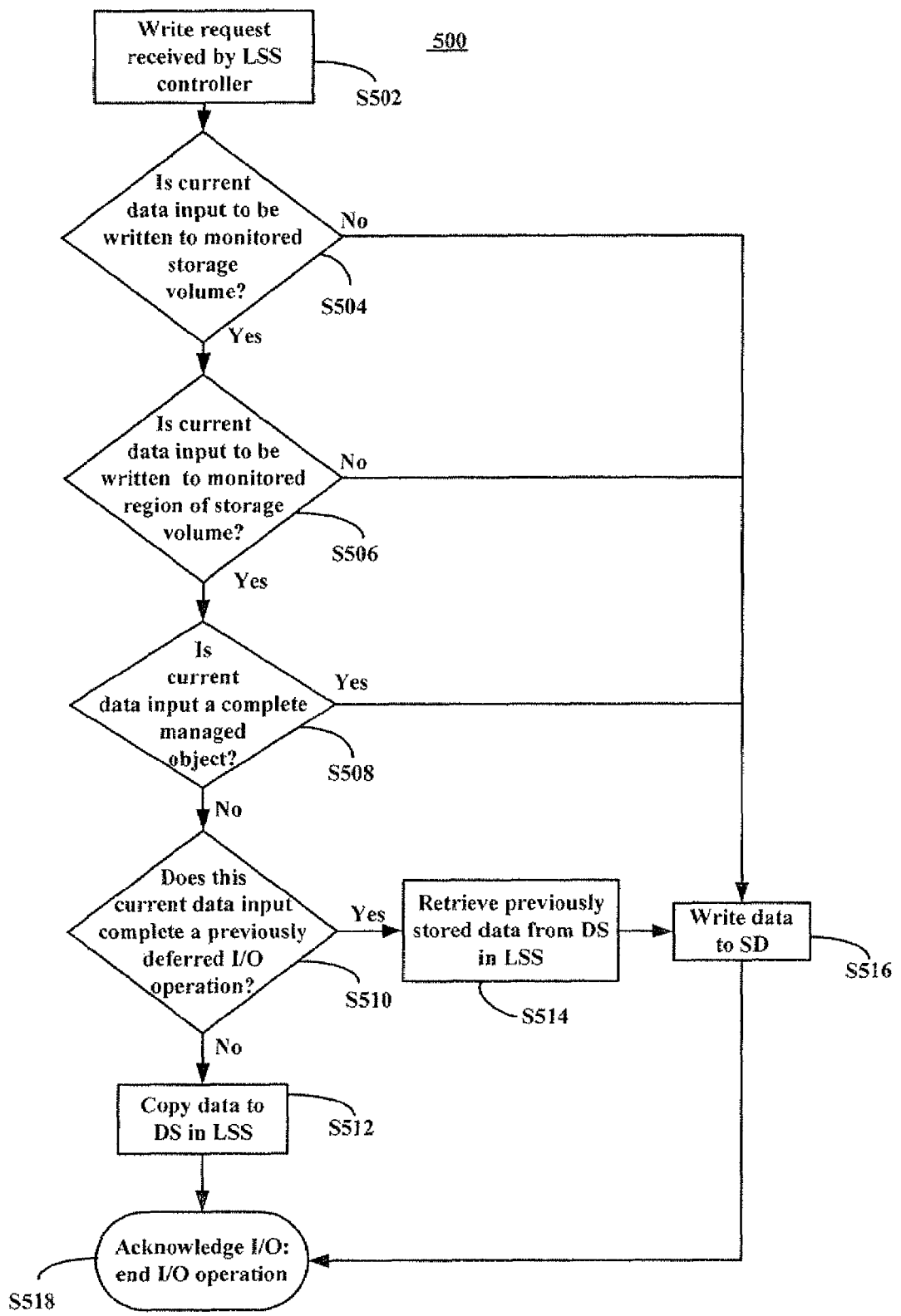
FIG. 5 illustrates a flowchart representative of a local storage subsystem storage session management flow relating to the system illustrated in FIG. 4.
Figure 7:
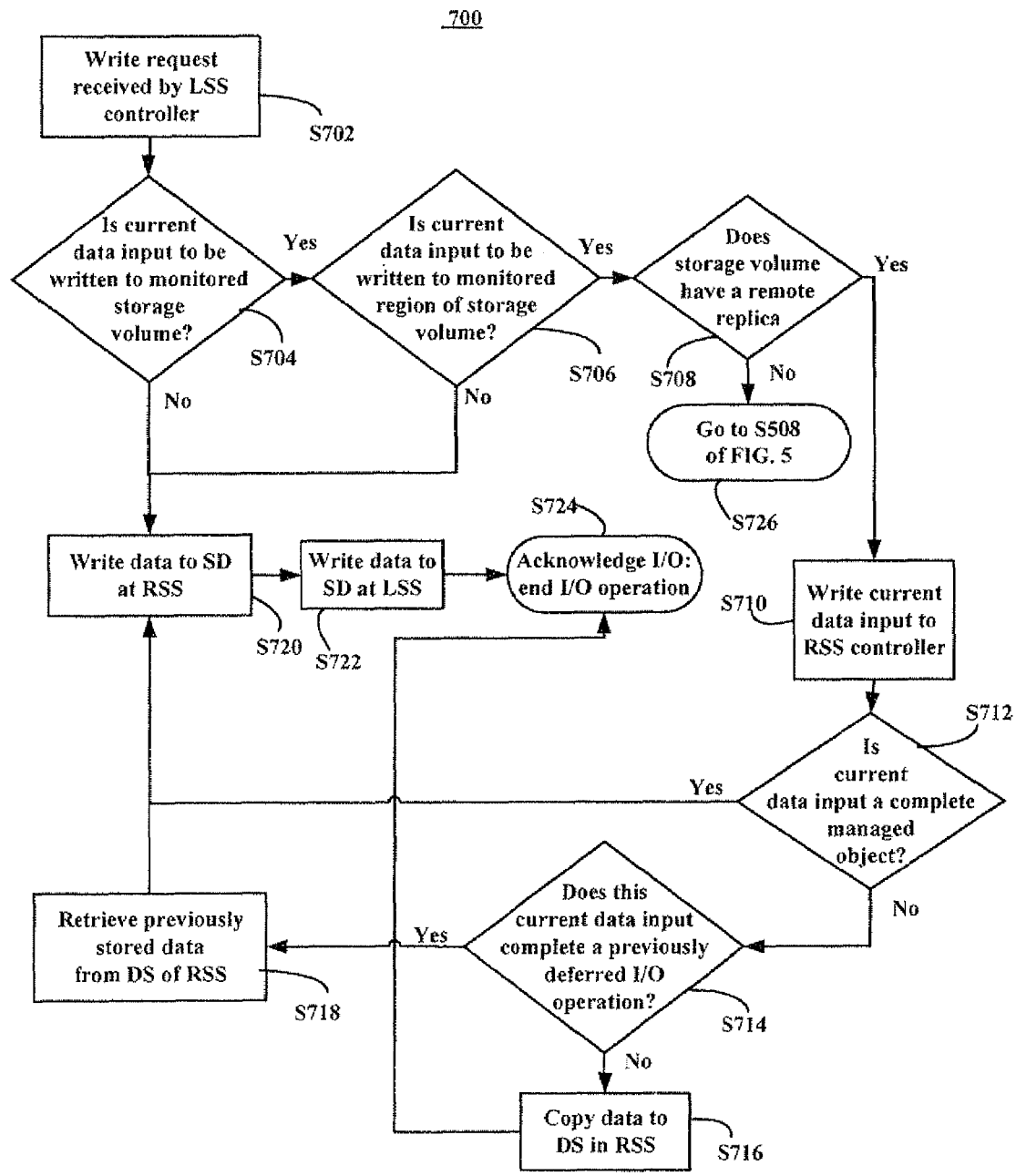
FIG. 7 illustrates a flowchart representative of a first embodiment of a remote storage subsystem storage session management flow relating to the system illustrated in FIG. 6.
Figure 8:
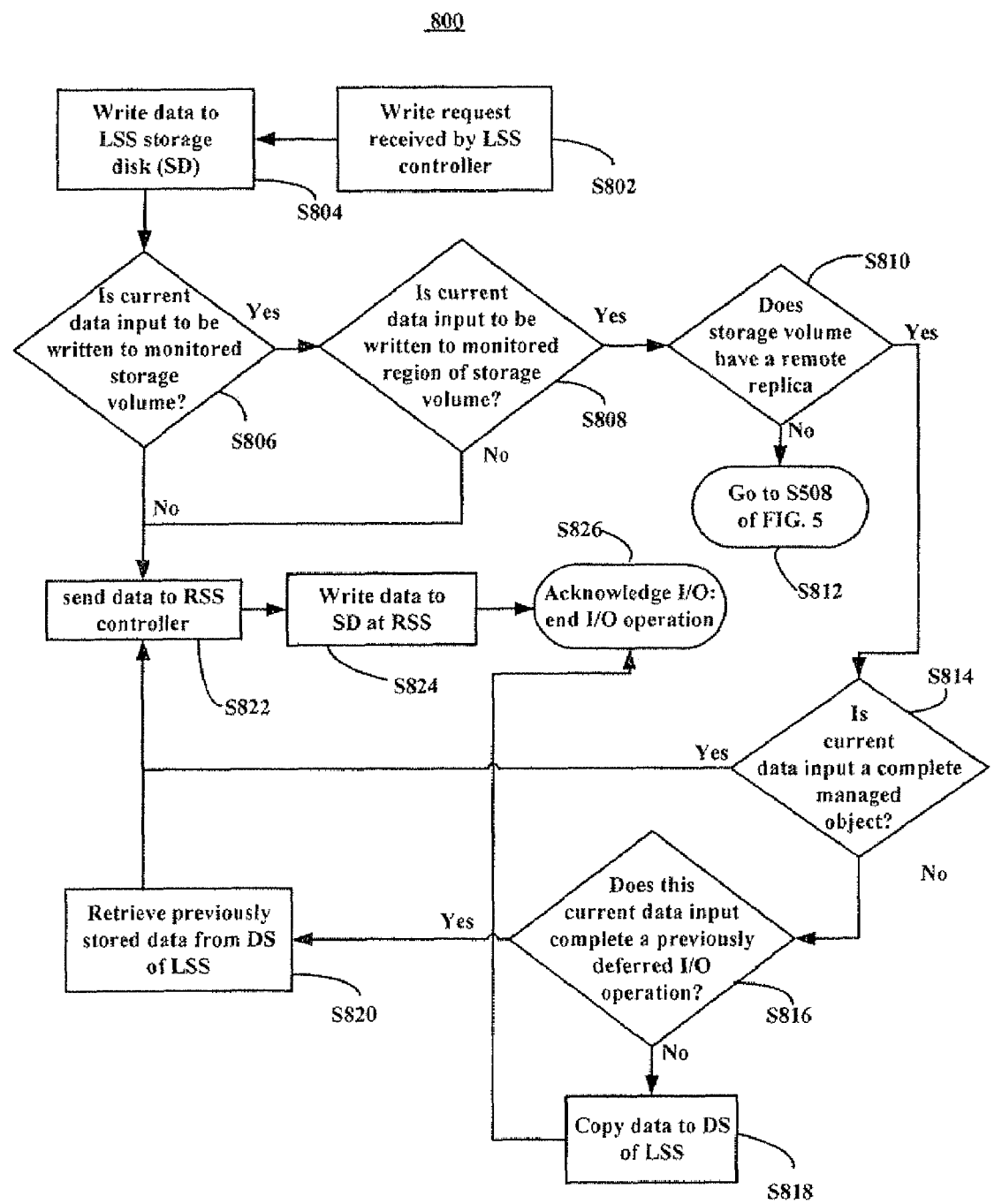
FIG. 8 illustrates a flowchart representative of a second embodiment of a remote storage subsystem storage session management flow relating to the system illustrated in FIG. 6.

The processor in the respective storage system device executes all determinations in this flowchart 300 and the flowcharts 500, 700 and 800 in FIGS. 5, 7 and 8, respectively. The processor looks for a match between the header information of the write request and the information in the software component embedded in the respective storage system device. Specifically, the processor compares the volume regions and extent size of the write request, as indicated by the destination address, with the volume regions and extent size of managed objects in the monitored regions of storage volumes. The data regarding the volume regions and extent size of the managed objects was stored in the memory of the respective storage system device when the software component was transmitted during the initialization process described in flowchart 100.

The stages S302-S318 describe the process in which an exemplary host bus adapter receives a write request, determines if the write request is a complete managed object or if the current data input completes a previously deferred I/O operation and writes the current data input to a deferred storage devices based on the determinations.

At S302, a write request for local storage is received at one of the host bus adapters 51-54 from a user 21-28. At S304, the host bus adapter 51-54 reads information in the I/O request header to determine if the current data input is to be written to a monitored region of a storage volume. If it is determined that the current data input is not to be written to a monitored region of the storage volume, the flow proceeds to stage S316.

At S316, the current data input is written to one or more of the local storage devices 91-98. The flow proceeds to stage S318. At S318, the I/O operation is ended with the transmission of an I/O acknowledgement to the initiator of the I/O request. The I/O acknowledgement is transmitted from the host computer 31-34 or the host bus adapter 51-54 to the initiator of the I/O request.

If it is determined at S304 that the current data input is to be written to a monitored region of a storage volume, the flow proceeds to stage S306. At S306, the processor in the host bus adapter 51-54 reads information in the request header of the current I/O request to determine if the current data input is for a monitored region of the storage volume. This determination is required since all the data blocks of the monitored region of the storage volume may not require monitoring during data backup.

If the host bus adapter 51-54 determines that the current data input is not to be written to a monitored region of the storage volume, the flow continues from stage S316 as described above.

If it is determined at S306 that current data input is to be written to a monitored region of the storage volume, the flow proceeds to stage S308. At S308, the processor in the host bus adapter 51-54 reads information in the I/O request header to determine if the current data input is a complete managed object. If it is determined at S308 that the current data input is a complete managed object, the flow continues from stage S316 as described above.

If it is determined at S308 that the current data input does not include a complete application page, the flow proceeds to stage S310. At S310, the processor in host bus adapter 51-54 monitors the destination address of the received write request to determine if the I/O operation for the current data input completes a previously deferred I/O operation.

If it is determined at S310 that the current data input completes a previously deferred I/O operation, the flow proceeds to stage S314. At S314, the previously stored data from the deferred storage device of the host bus adapter 51-54 is retrieved. The retrieved deferred data are combined with the current data input by the processor to form the complete managed object. In one embodiment, retrieved deferred data are sequenced, linked and combined with the current data input by the processor to form the complete managed object. At S316, the processor in the host bus adapter 51-54 writes a combination of the current data input and the retrieved data to a monitored region of the storage volume of one or more of the local storage devices 91-98 based on the determinations of S304 to S310. The data is transmitted through storage area network switch 60 to one or more of the storage devices 91-98. At S318, the I/O operation is ended with the transmission of an I/O acknowledgement to the initiator of the I/O request.

If it is determined at S310 that the current data input does not complete a previously deferred I/O operation, the flow proceeds to stage S312. At S312, the received current data input is copied to a deferred storage device in the host bus adapter 51-54. The deferred storage device stores all the received current data inputs until the last current data input of an I/O operation is received. The flow proceeds to stage S318 and the I/O operation is ended with the transmission of an I/O acknowledgement to the initiator of the I/O request.

As described in flowchart 300, when the host bus adapter receives a write request, the processor executes a stored computer program to determine if the location to which the data is to be written is in a monitored region. If it is a write request to a monitored region, the processor executes a stored computer program to determine if complete pages have been received. If a partial page is included in the write data, the processor executes a stored computer program to determine if this data completes a previously deferred write operation. If no deferred write data is stored for this page, the processor executes a stored computer program to direct the partial page data is written to a local memory storage location. When the remainder of the page is received, the processor executes a stored computer program to write a combination of the current data input and the retrieved data to a storage device.

By holding and combining all the current data inputs for one I/O operation and transmitting them at one time through the storage area network switch 60 to the local storage devices 91-98, the risk of dropping data in an I/O operation is reduced. The chance that a mismatched page section is written to the local storage devices 91-98 consequently reduced or eliminated.

Figure 4:
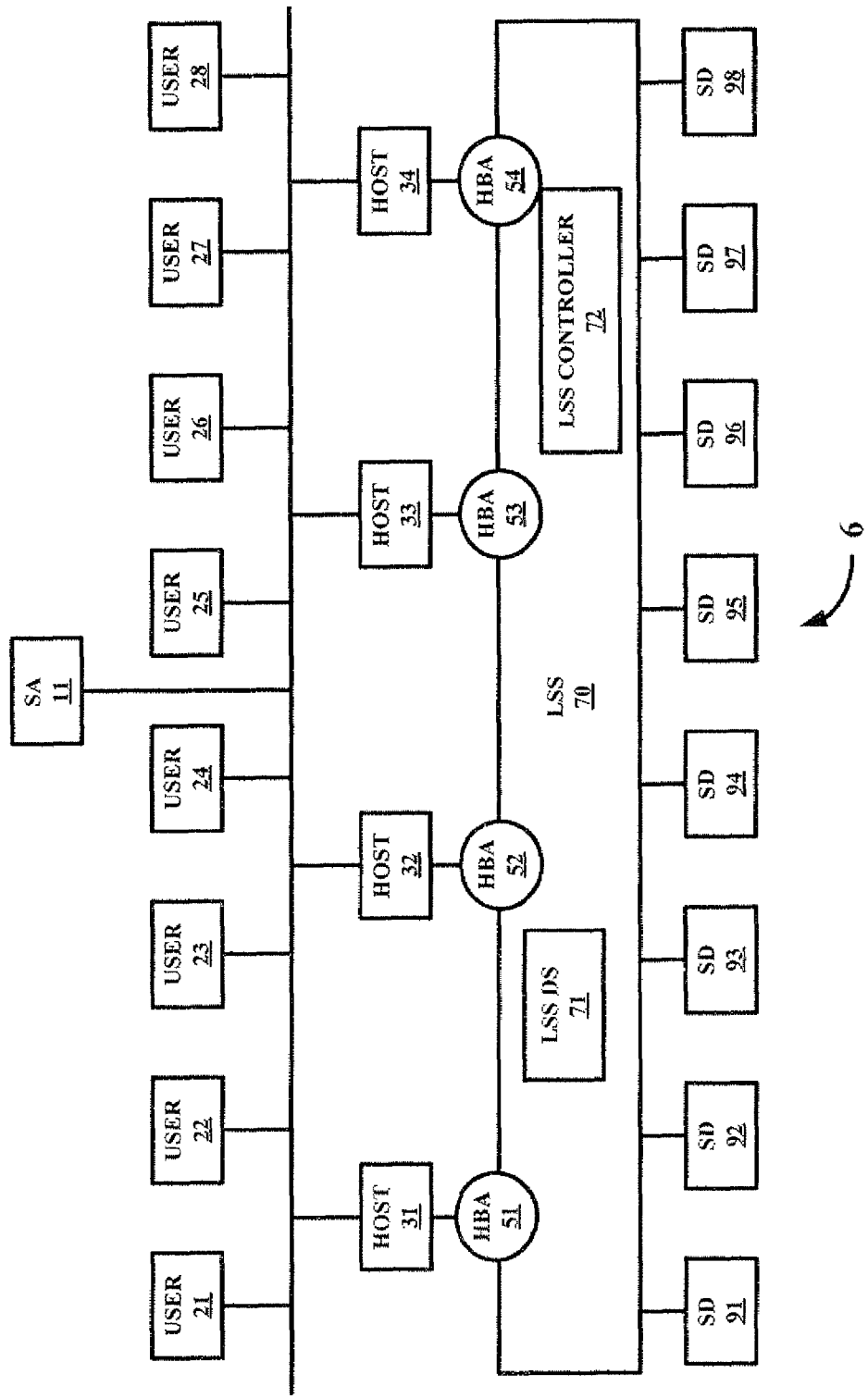
FIG. 4 illustrates a schematic of a local storage subsystem configuration in accordance with a second embodiment of the present invention.

FIG. 4 illustrates a schematic of a local storage subsystem 6 configuration in accordance with a second embodiment of the present invention in which like elements share like reference numbers with FIG. 2.

In this embodiment, the users 21-28 are linked to a local storage system 6, which includes host computers (HOST) 31-34, host bus adapters (HBA) 51-54, a local storage subsystem (LSS) 70 and local storage devices (SD) 91-98. Local storage subsystem 70 includes a deferred storage device (LSS DS) 71 and a local storage subsystem controller (LSS CONTROLLER) 72. Local storage subsystem controller 72 performs the logic required to make determinations about received data inputs. Local storage subsystem controller 72 includes a processor (not shown) and a memory (not shown) coupled to the processor. The memory stores instructions in a computer program on computer readable medium, which are executable by a digital processing apparatus to perform the operations to protect stored data. The processor, memory, and computer instructions are contained in one or more processing units (controllers) in the local storage subsystem. The processing unit exists in all modern storage subsystems. The current invention takes advantage of the existing processor and storage components and adds computer instructions to the computer program (firmware) that contains the instructions that manage the storage subsystem.

FIG. 5 illustrates a flowchart 500 representative of a local storage subsystem storage session management flow relating to the exemplary system 6 illustrated in FIG. 4. The stages S502-S518 describe the process in which an exemplary local storage subsystem 70 receives a write request, determines if the write request is a complete managed object or if the current data input completes a previously deferred I/O operation and writes the current data input to a deferred storage devices based on the determinations.

At S502, a write request for local storage is received at local storage subsystem controller 72 of the local storage subsystem 70 from a user 21-28. At S504, the local storage subsystem controller 72 reads information in the I/O request header to determine if the current data information is to be written to a monitored region of a storage volume. If it is determined that the current data input is not to be written to a monitored region of a storage volume, the flow proceeds to stage S516. At S516, the current data input is written to one or more of the local storage devices 91-98. The flow then proceeds to stage S518. At S518, the I/O operation is ended with the transmission of an I/O acknowledgement from local storage subsystem 70 to the initiator of the I/O request.

If it is determined at S504 that the current data input is to be written to a monitored region of the storage volume, the flow proceeds to stage S506. At S506, the local storage subsystem controller 72 reads information in the I/O request header of the current data input to determine if the current data input is to be written to a monitored region of the storage volume. If the local storage subsystem 70 determines that the current data input is not to be written to a monitored region of the storage volume, the flow continues from stage S516 as described above.

If it is determined at S506 that current data input is to be written to a monitored region of the storage volume, the flow proceeds to stage S508. At S508, the local storage subsystem controller 72 in the local storage subsystem 70 reads information in the I/O request header to determine if the current data input is a complete managed object. If the current data input is a complete managed object, the flow continues from stage S516 as described above.

If it is determined at S508 that the current data input does not include a complete managed object, the flow proceeds to stage S510. At S510, the local storage subsystem controller 72 monitors the destination address of the received write request to determine if this I/O operation for the current data input completes a previously deferred I/O operation. If it is determined at S510 that the current data input does not complete a previously deferred I/O operation, the flow proceeds to stage S512. At S512, the received current data input is copied to local deferred storage device 71 in local storage subsystem 70. The local deferred storage device 71 stores all the received current data inputs until the last current data input of an I/O operation is received. At S518, the I/O operation is ended with the transmission of an I/O acknowledgement to the initiator of the I/O request.

If the current data input completes a previously deferred I/O operation, the flow proceeds to stage S514. At S514, the previously stored data from the local deferred storage device 71 of the local storage subsystem 70 is retrieved. The retrieved deferred data are combined with the current data input by the local storage subsystem controller 72 in the local storage subsystem 70 to form the complete managed object. In one embodiment, the retrieved deferred data are sequenced, linked and combined with the current data input by the local storage subsystem controller 72 to form the complete managed object.

At S516, the local storage subsystem controller 72 in the local storage subsystem 70 writes a combination of the current data input and a retrieved data to local storage devices 91-98 based on the determinations of stages S504 to S510. The data is transmitted to a monitored region of the storage volume of one or more local storage devices 91-98. At S518, the I/O operation is ended with the transmission of an I/O acknowledgement from local storage subsystem 70 to the initiator of the I/O request.

By holding all the current data inputs for an I/O operation until all the current data inputs are received at the local storage subsystem 70 and then writing the combined current data input at one time to the local storage devices 91-98, the risk of dropping data in an I/O operation is eliminated or reduced with a resultant reduction of mismatched page sections in the storage devices 91-98.

Figure 6:
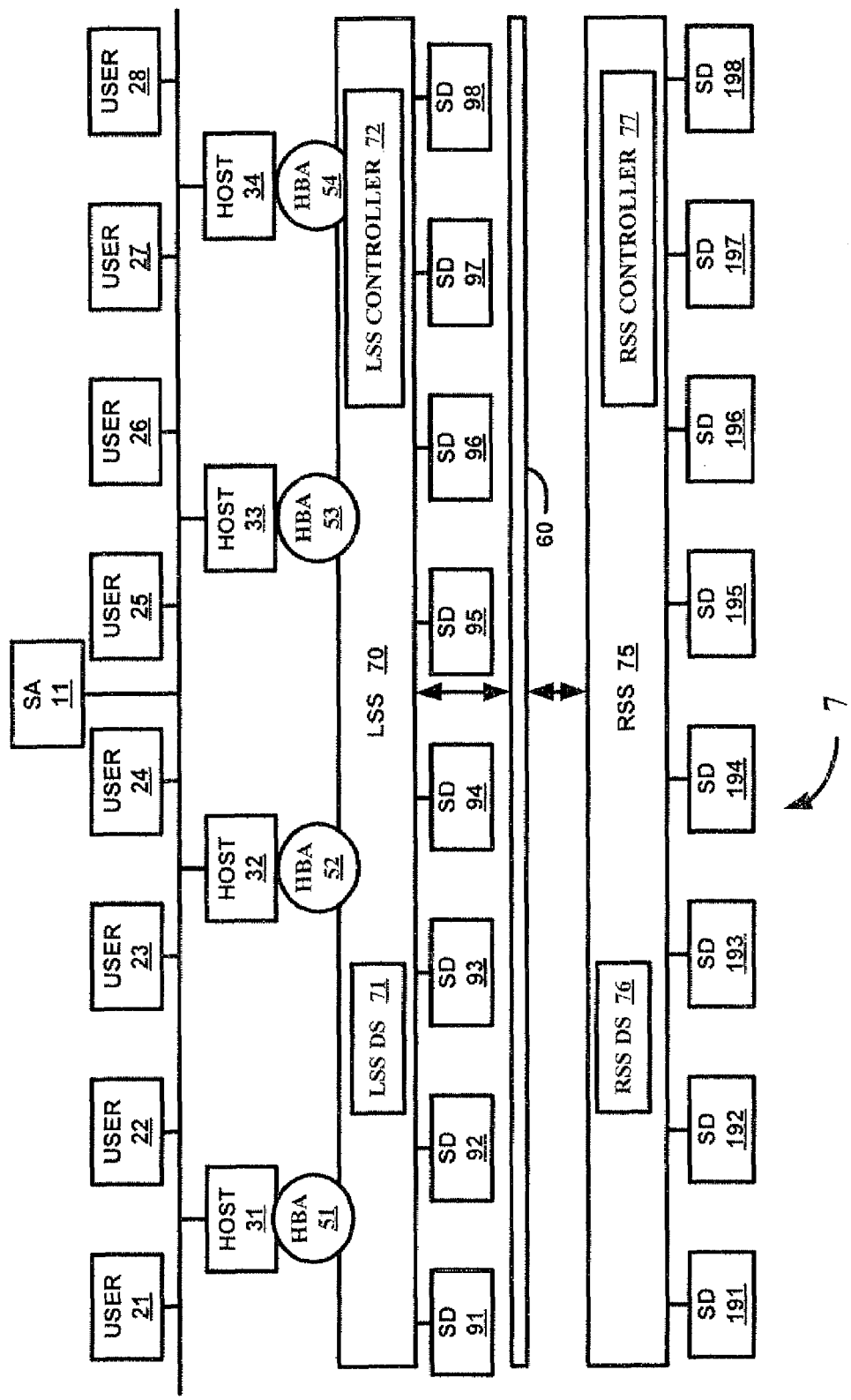
FIG. 6 illustrates a schematic of a remote storage subsystem configuration in accordance with a third embodiment of the present invention.

FIG. 6 illustrates a schematic of a remote storage subsystem 7 configuration in accordance with a third embodiment of the present invention in which like elements share like reference numbers with FIG. 4. Local storage subsystem 7 includes users 21-28 operating conventional computing devices and a system administrator 11. The users 21-28 are connected to a storage system, which includes host computers (HOST) 31-34, host bus adapters (HBA) 51-54 attached to the respective host computers 31-34, a local storage subsystem (LSS) 70, a storage area network switch 60, a remote storage subsystem (RSS) 75, local storage devices (SD) 91-98 and remote storage devices (SD) 191-198.

Local storage subsystem 70 is structured and functions as described in relation to FIG. 4. Local storage subsystem 70 is in communication with remote storage subsystem (RSS) 75 via storage area network switch 60.

Remote storage subsystem 75 includes a remote deferred storage device (RSS DS) 76 and a remote storage subsystem controller (RSS CONTROLLER) 77. Remote storage subsystem controller 77 includes a processor (not shown) and a memory (not shown) coupled to the processor. The memory stores instructions in a computer program on computer readable medium, which are executable by a digital processing apparatus to perform the operations to protect stored data. Remote storage subsystem 75 is in direct communication with remote storage devices 191-198.

The software component is embedded in local storage subsystem controller 72 and remote storage subsystem controller 77 to make them operable to perform the logic required to make determinations about received data inputs. Specifically, the processors in the local storage subsystem controller 72 and remote storage subsystem controller 77 are configured by the data embedded software component to determine if received current data inputs of the write request are from a managed object to be stored in one of the monitored regions of the storage volume.

Local storage subsystem controller 72 and remote storage subsystem controller 77 as configured in remote storage subsystem 7 are operable to protect both the local and remote copy of the application or database and to ensure that each page or extent is continuously consistent and recoverable at the local or remote location.

FIG. 7 illustrates a flowchart 700 representative of a first embodiment of a remote storage subsystem storage session management flow relating to the exemplary system 7 illustrated in FIG. 6. The stages S702-S726 describe the process in which an exemplary local storage subsystem receives a write request, determines if the write request is a complete managed object or if the current data input is completes a previously deferred I/O operation and writes the current data input to a remote deferred storage device based on the determinations.

At S702, a write request is received at local storage subsystem 70 from a user 21-28. At S704, the local storage subsystem 70 reads information in the I/O request header to determine if the current data input is to be written to a monitored region of a storage volume. If it is determined that the current data input is not to be written to a monitored region of a storage volume, the flow proceeds to stage S720.

At S720, the current input data is written to one or more remote storage devices 191-198 in the remote storage subsystem 75. The flow proceeds to stage S722 and the current input data is written to one or more local storage devices 91-98 of local storage subsystem 70. At S724, the I/O operation is ended with the transmission of an I/O acknowledgement from local storage subsystem 70 to the initiator of the I/O request. I/O acknowledgement is transmitted from local storage subsystem 70 via the host computer 31-34 to the initiator of the I/O operation 21-28. In one embodiment, the I/O acknowledgement is transmitted from the local storage subsystem 70 to a host computer 31-34 via a respective host bus adapter 51-54 to the initiator 21-28. In an alternative embodiment, the I/O acknowledgement is transmitted from remote storage subsystem 75 to the host computer 31-34 via storage area network switch 60 and local storage subsystem 70.

If it is determined at S704 that the current data input is to be written to a monitored region of the storage volume, the flow proceeds to stage S706. At S706, the local storage subsystem controller 72 in the local storage subsystem 70 reads information in the I/O request header of the current data input to determine if the current data input is to be written to a monitored region of the storage volume. If the local storage subsystem 70 determines that the current data input is not to be written to a monitored region of the storage volume, the flow continues from stage S720 as described above.

If it is determined at S706 that current data input is to be written to a monitored region of the storage volume, the flow proceeds to stage S708. At S708, local storage subsystem controller 72 determines if the storage volume has a remote replica. If the storage volume has a remote replica, it is to be mirrored at a remote storage subsystem 75.

If it is determined at S708 that a there is no remote replica for the storage volume of the current data input, the flow proceeds to stage S726. At S726, the flow is directed to stage S508 of flowchart 500 in FIG. 5 since the write request is not for a remote storage.

If it is determined at S708 that the storage volume has a remote storage, such as remote storage subsystem 75, the flow proceeds to stage S710. At S710, the current data input is written to remote storage subsystem controller 77 via storage area network switch 60. At S712, remote storage subsystem controller 77 reads information in the I/O request header to determine if the current data input is a complete managed object. If the current data input is a complete managed object, the flow continues from stage S720 as described above.

If it is determined at S712 that the current data input does not include a complete managed object, the flow proceeds to stage S714. At S714, remote storage subsystem controller 77 monitors the destination address of the received write request to determine if this I/O operation for the current data input completes a previously deferred I/O operation. If it is determined at S714 that the current data input does not complete a previously deferred I/O operation, the flow proceeds to stage S716. At S716, the received current data input is copied to remote deferred storage device 76. The remote deferred storage device 76 stores all received current data inputs until the last current data input of an I/O operation is received. The flow proceeds to stage S724 and the I/O operation ends as described above.

If the current data input completes a previously deferred I/O operation, the flow proceeds to stage S718. At S718, the previously stored deferred data is retrieved from the remote deferred storage device 76 at the remote storage subsystem 75. The retrieved deferred data are combined with the current data input by the remote storage subsystem controller 77 to form the complete managed object. In one embodiment, the retrieved deferred data are sequenced, linked and combined with the current data input by the remote storage subsystem controller 77 to form the complete managed object. The flow proceeds to stage S720.

At S720, the remote storage subsystem controller 77 writes the combination of the current data input and the retrieved data to one or more remote storage devices 191-198 based on the determinations of stages S712 to S714. At S722, the local storage subsystem controller 72 in the local storage subsystem 70 writes a combination of the current data input and a retrieved data to one or more local storage devices 91-98 based on the determinations of stages S712 to S714.

The remote storage session management flow described in flowchart 700 describes a method to monitor a managed object at the remote storage subsystem 70. The managed object is copied as one complete managed object to remote storage devices 191-198 and then to local storage devices 91-98. By holding all the current data inputs for an I/O operation until all the current data inputs are received at the remote deferred storage device 76 and then writing the managed object at one time to the remote storage devices 191-198 and local storage devices 91-98, the managed object is known to be complete before it is written to the monitored regions of the storage volume of storage devices 191-198 and 91-98. This prevents mismatched page sections due to partial-page-writes in the remote storage devices 191-198 and local storage devices 91-98.

FIG. 8 illustrates a flowchart 800 representative of a second embodiment of a remote storage session management flow relating to the exemplary system 7 illustrated in FIG. 6. The stages S802-S826 describe the process in which an exemplary local storage subsystem receives a write request, determines if the write request is a complete managed object or if the current data input completes a previously deferred I/O operation and writes the current data input to a local deferred storage devices based on the determinations. In this embodiment, only complete pages are transmitted across the data medium to the remote storage subsystem, therefore, only complete pages can be written at the remote storage subsystem.

At S802, a write request is received at local storage subsystem 70 from a user 21-28. At S804, the local storage subsystem 70 writes the current data input to one or more local storage devices 91-98. At S806, the local storage subsystem controller 72 of local storage subsystem 70 reads information in the I/O request header to determine if the current data input is to be written to a monitored region of a storage volume. If it is determined that the current data input is not to be written to a monitored region of the storage volume, the flow proceeds to stage S822. At S822, the current input data is sent to remote storage subsystem controller 77 of remote storage subsystem 75 via storage area network switch 60. At S824, the remote storage subsystem controller 77 writes the current data input to one or more of the remote storage devices 191-198. The flow proceeds to stage S826. At S826, the I/O operation is ended with the transmission of an I/O acknowledgement to the initiator of the I/O request. I/O acknowledgement is transmitted from remote storage subsystem 75 via storage area network switch 60 and local storage subsystem 70 to the initiator of the I/O request.

If it is determined at S806 that the current data input is to be written to a monitored region of the storage volume, the flow proceeds to stage S808. At S808, the local storage subsystem controller 72 in the local storage subsystem 70 reads information in the I/O request header to determine if the current data input is to be written to a monitored region of the storage volume. If the local storage subsystem 70 determines that the current data input is not to be written to a monitored region of the storage volume, the flow continues from stage S822 as described above.

If it is determined at S808 that current data input is to be written to a monitored region of the storage volume, the flow proceeds to stage S810. At S810, local storage subsystem controller 72 determines if the storage volume has a remote replica. If the storage volume has a remote replica, it is to be mirrored at a remote storage subsystem 75.

If it is determined at S810 that a there is no remote replica for the storage volume of the current data input, the flow proceeds to stage S812. At S812, the flow is directed to stage S508 of flowchart 500 in FIG. 5 since the write request is not for a remote storage.

If it is determined at S810 that the storage volume has a remote storage, such as remote storage subsystem 75, the flow proceeds to stage S814. At S814, local storage subsystem controller 72 reads information in the I/O request header to determine if the current data input is a complete managed object. If the current data input is a complete managed object, the flow continues from S822 as described above.

If it is determined at S814 that the current data input does not include a complete managed object, the flow proceeds to stage S816. At S816, local storage subsystem controller 72 determines if the current data input completes a previously deferred I/O operation. The local storage subsystem controller 72 monitors the destination address of the received write request to determine if the I/O operation for the current data input completes a previously deferred I/O operation.

If it is determined at S816 that the current data input does not complete a previously deferred I/O operation, the flow proceeds to stage S818. At S818, the received current data input is copied to local deferred storage device 71 in local storage subsystem 70. The local deferred storage device 71 stores all received current data inputs until the last current data input of an I/O operation is received. At S826, the I/O operation is ended with the transmission of an I/O acknowledgement to the initiator of the I/O request as described above.

If the current data input completes a previously deferred I/O operation, the flow proceeds to stage S820. At S820, the previously stored data is retrieved from the local deferred storage device 71. The retrieved deferred data are combined with the current data input by the local controller 77 to form the complete managed object. In one embodiment, the retrieved deferred data are sequenced, linked and combined with the current data input by the local controller 77 to form the complete managed object. The flow proceeds to stage S822 and the flow proceeds as described above.

Flowchart 800 describes a session management flow for semi-synchronous remote replication of storage subsystem volumes. The managed objects are monitored by the local storage subsystem 70. In this embodiment, the managed object is copied to local storage devices 191-198 and, if the data is monitored mirrored data, to local deferred storage device 71. All current data inputs for an I/O operation of a managed object are held in local deferred storage device 71 until all the current data inputs for the I/O operation are received at the local storage subsystem 70. Then the managed object is written to remote storage subsystem 75 as one complete managed object.

By holding all the current data inputs for an I/O operation until all the current data inputs are received at the local deferred storage device 71 and then writing the managed object at one time, the managed object is known to be complete before it is written to a monitored region of a storage volume of one or more storage devices 191-198. This prevents mismatched page sections in the remote storage devices 191-198, if a break or failure occurs before the complete managed object is written to remote and local storage devices, no remote storage is done. In that event no acknowledgement will go back to the users or the system administrator. The managed object is sent periodically until the acknowledgement is received.

In practice, various methods of transmitting an acknowledgement for the data protection methods described in flowcharts 300, 500, 700 and 800 as would occur to those having ordinary skill in the art can be implemented to indicate to a user that the data has been stored in a remote storage subsystem and/or local storage subsystem.

In practice, various modifications of the flows described in flowcharts 300, 500, 700 and 800 as would occur to those having ordinary skill in the art can be implemented to protect data backup to local storage subsystems and/or remote storage subsystems.

Figure 9:
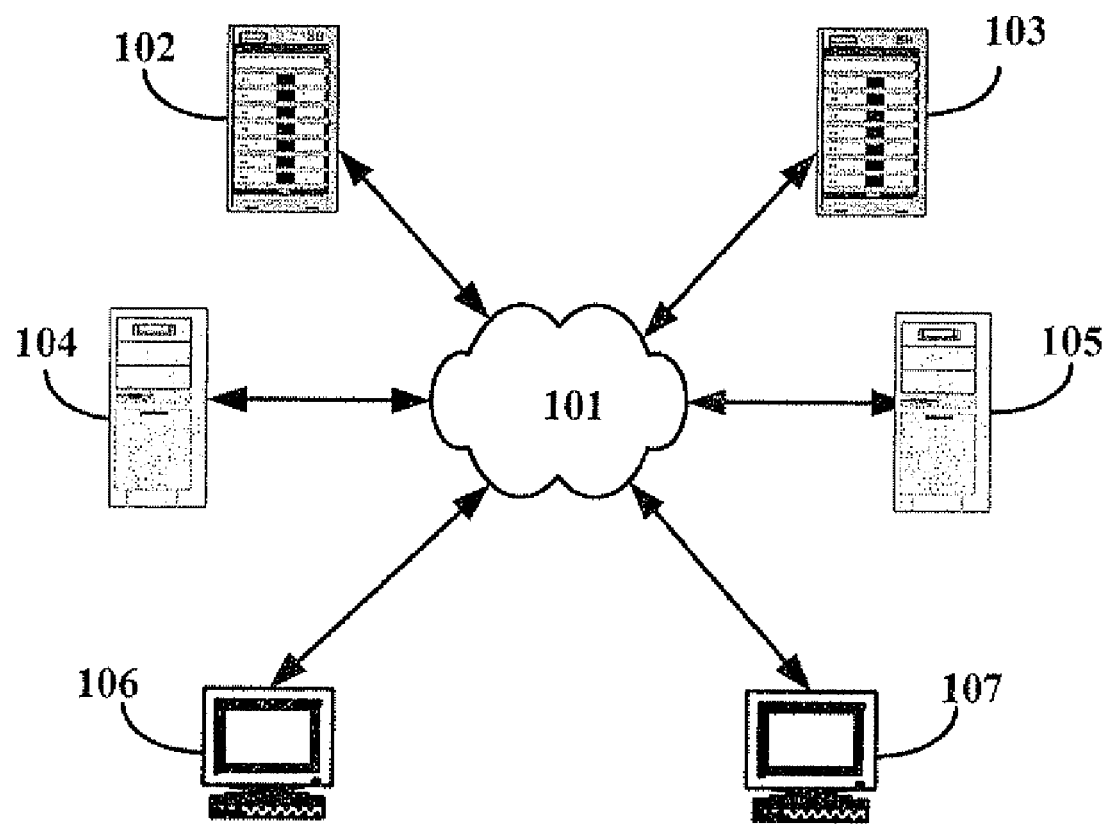
FIG. 9 depicts a distributed data processing network as known in the art for practicing the present invention.

The signal bearing medium tangibly embodying a program of machine-readable instructions executable by processors to perform operations to operate a system in protecting data storage systems in accordance with the present invention could be implemented on a variety of hardware platforms. FIG. 9 depicts a distributed data processing network 100 employing a network 101, which is the media used to provide communications links between various devices and computers connected together within distributed data processing network 100. Network 101 may include permanent connections, such as wire or fiber optic cables.

In the depicted example, storage systems 102 and 103, conventional service centers 104 and 105, and conventional users 106 and 107 are connected to network 91. Storage system 102 and storage system 103 represent a remote storage subsystem 75 or local storage subsystem 70 in accordance with the present invention, such as, for example, a local storage subsystem 70 including local controller 72, local deferred storage device 71, and storage devices 91-98, as illustrated in FIGS. 2, 5 and 7. Service centers 104 and 105 represent a variety of hosts 31-34. Users 106 and 107 represent a variety of conventional computing devices, such as mainframes, personal computers, personal digital assistants (PDAs), etc., which were illustrated as users 21-28 in FIGS. 2, 4 and 6. Distributed data processing network 100 may include more or fewer storage systems, servers and clients as shown as well as additional networks, routers, switches and other devices as would occur to those having ordinary skill in the art.

Distributed data processing network 100 may include the Internet with network 91 representing a worldwide collection of networks and gateways that use the TCP/IP suite of protocols to communicate with one another. Of course, distributed data processing network 130 may also include a number of different types of networks, such as, for example, an intranet, a local area network (LAN), or a wide area network (WAN).

FIG. 9 is an example of a heterogeneous computing environment and is not an architectural limitation for the present invention. In addition to being able to be implemented on a variety of hardware platforms, the present invention may be implemented in a variety of software environments in order to store computer programs of the present invention within or on a computer readable medium whereby a conventional operating system may be used to control program execution of the present invention within the data processing system. Those having ordinary skill in the art will appreciate various software languages that can be employed in writing software code for the various users interfaces of the present invention.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A system to protect data, comprising:
   a processor; and
   a memory coupled to the processor to store instructions executable by a digital processing apparatus to perform operations to protect stored data, the operations comprising:
   receiving a write request for a current data input comprising input to be written to at least one monitored region of a storage volume;
   determining whether the current data input is a complete managed object and whether the current data input completes a previously deferred I/O operation; and
   writing the current data input to a deferred storage device based on the determinations.

2. The system of claim 1, the operations further comprising:
   selecting a managed object;
   identifying an extent size of the managed object;
   identifying storage volume regions for the managed object; and
   transmitting a software component based on the identified extent size and the identified storage volume regions, wherein the software component is embedded in a storage system device.

3. The system of claim 2 wherein the storage system device is selected from the group consisting of a host bus adapter, a remote storage subsystem controller, and a local storage subsystem controller.

4. The system of claim 1, the operations further comprising:
writing the current data input to a storage device based on the determinations.

5. The system of claim 1, the operations further comprising:
determining if a managed object spans more than one data block; and
segmenting the managed object based on the determination.

6. The system of claim 1, wherein the determining whether the current data input completes a previously deferred I/O operation comprises monitoring a destination address of the received write request.

7. The system of claim 1, wherein the writing the current data input to a deferred storage device comprises writing the current data input to a deferred storage device in a host bus adaptor.

8. The system of claim 1, wherein the writing the current data input to a deferred storage device comprises writing the current data input to a deferred storage device in a local storage subsystem.

9. The system of claim 1, wherein the writing the current data input to a deferred storage device comprises writing the current data input to a deferred storage device in a remote storage subsystem.

10. A computer readable medium storing a computer program executable by a digital processing apparatus to perform operations to protect data, the operations comprising:
receiving a write request for a current data input comprising input to be written to at least one monitored region of a storage volume;
determining whether the current data input is a complete managed object and whether the current data input completes a previously deferred I/O operation; and
writing the current data input to a deferred storage device based on the determinations.

11. The medium of claim 10, the operations further comprising:
selecting a managed object;
identifying an extent size of the managed object;
identifying storage volume regions for the managed object; and
transmitting a software component based on the identified extent size and the identified storage volume regions, wherein the software component is embedded in a storage system device.

12. The medium of claim 10, the operations further comprising:
writing the current data input to a storage device based on the determinations.

13. The medium of claim 10, the operations further comprising:
determining if a managed object spans more than one data block; and
segmenting the managed object based on the determination.

14. The medium of claim 10, wherein the determining whether the current data input completes a previously deferred I/O operation comprises monitoring a destination address of the received write request.

15. The medium of claim 14, wherein the monitoring a destination address of the received write request occurs at a location selected from the group consisting of a local storage subsystem, a remote storage subsystem, a local host bus adapter, a remote host bus adapter, and a combination thereof.

16. A system to protect data comprising:
a processor receiving a write request for a current data input comprising input to be written to at least one monitored region of a storage volume; and
a deferred storage device;
wherein the processor determines whether the current data input is a complete managed object and whether the current data input completes a previously deferred I/O operation, and the deferred storage device stores the current data input based on the determinations of the processor.

* * * * *